UNITED STATES PATENT OFFICE.

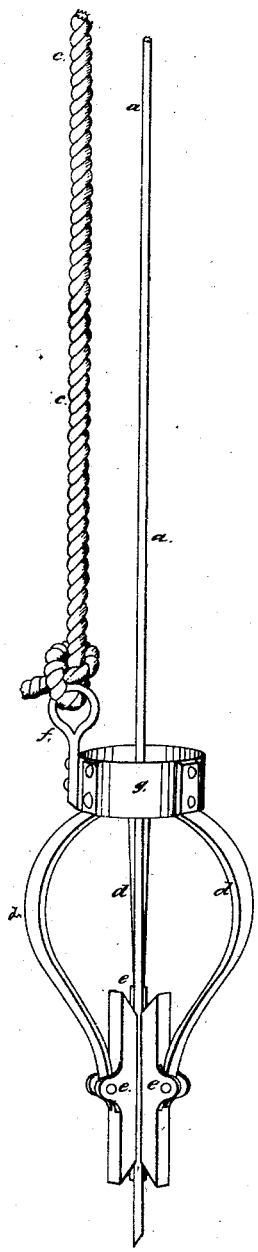

THOMAS SHAW, OF PHILADELPHIA, PENNSYLVANIA, ASSIGNOR TO HIMSELF AND PHILIP S. JUSTICE.

IMPROVEMENT IN MODE OF LAYING TELEGRAPHIC CABLES.

Specification forming part of Letters Patent No. 35,128, dated April 29, 1862.

*To all whom it may concern:*

Be it known that I, THOMAS SHAW, of the city and county of Philadelphia, and State of Pennsylvania, have invented a new and Improved Mode of Laying Telegraphic Cables; and I hereby declare the following to be a full, clear, and exact description of the same, reference being had to the accompanying drawing, and to the letters of reference marked thereon.

My invention consists in the supporting of heavy cables at distances below the surface of the water by means of friction appliance held by a cable, as described hereinafter.

In order to enable others to practice my invention, I will proceed to describe its construction and operation.

On reference to the accompanying drawing, which forms a part of the specification, $a\ a$ represent the telegraphic cable on its line of descent. $c\ c$ represent a section of a rope cable, the upper end of which is secured to the ship, the lower end being secured to the eye $f$ on clutch $g$ for the purpose of supporting the same. The clutch is formed of the ring $g$, to which there are connected three springs, $d\ d\ d$, firmly pressing upon three blocks of metal, $e\ e\ e$, for the purpose of creating friction sufficient to support a certain amount of weight of the cable, the whole of which is supported by the rope cable $c$, which is firmly attached to the ship, as before described. The whole object of this arrangement is to support the cable at different points, that there be not too great a length from one place of support, or sufficient weight to bring the conducting-wire to a state of torsion.

It is evident that any of the ordinary friction appliances would answer in place of the described clutch. I therefore do not wish to confine myself to any particular kind of clutch; but

What I claim, and desire to secure by Letters Patent, is—

The partial supporting of the telegraphic cable, while paying out, by means of an additional cable, when connected with friction clutches, as before described.

THOMAS SHAW.

Witnesses:
   J. HOWARD MITCHELL,
   GEO. C. MITCHELL.